July 1, 1930.  G. G. GARVIS  1,769,218
ICE CREAM DISPENSER
Filed May 21, 1928
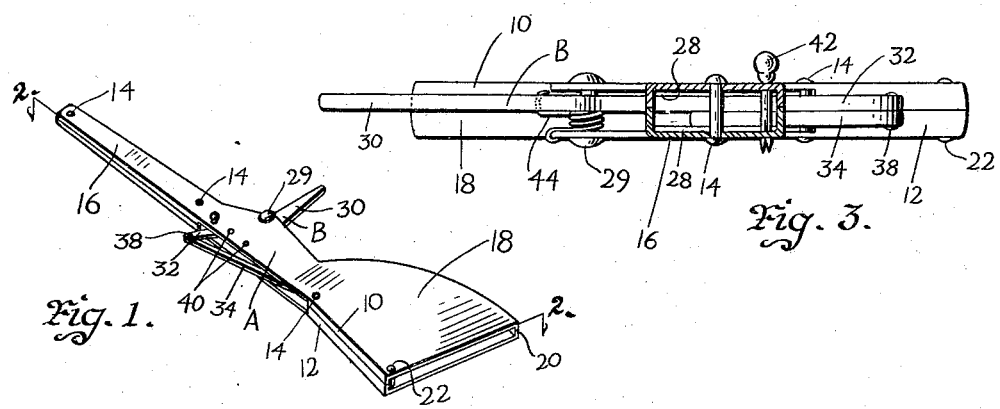
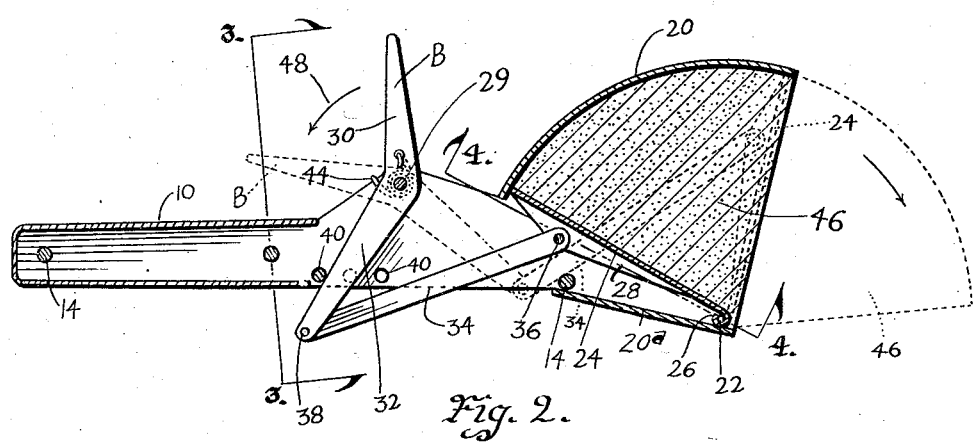
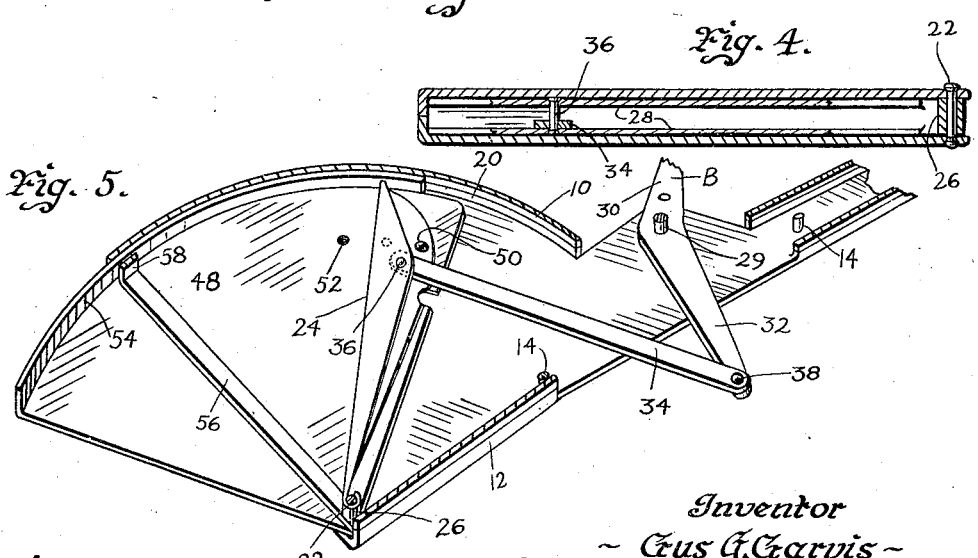
Inventor
~ Gus G. Garvis ~
by Barr, Freeman & Sinclair
Attorneys
Witness
Solomon Betensky Patented July 1, 1930

1,769,218

UNITED STATES PATENT OFFICE

GUS G. GARVIS, OF DES MOINES, IOWA

ICE-CREAM DISPENSER

Application filed May 21, 1928. Serial No. 279,247.

The object of my invention is to provide an ice cream dispenser of simple, durable and inexpensive construction.

A further object of my invention is to provide an ice cream dispenser especially adapted for dishing a piece of ice cream of the same shape as a piece of pie and placing the ice cream on top of the pie for serving the well known dish of pie a la mode.

More particularly, it is my object to provide a dispenser of this character from which the ice cream can be discharged in flat substantially triangular or sector shape, whereby it will fit the configuration of a piece of pie and will lie flat thereon and not have a tendency to roll off, as when the ice cream is applied to the pie with an ice cream dipper and will not have to be flattened, as with dipper served cream, with the consequent mashing of the pie.

Still a further object is to provide such a device in the form of a sector shape casing having a dispeller blade pivoted at the apex of the sector, whereby the casing may be filled with ice cream and the blade then moved for dispelling the ice cream.

Still a further object is to provide a modified form in which an arc-shaped and flat wall are connected with the movable dispeller blade, whereby these two walls move therewith and to also provide in connection with this modified form, a stripper blade adapted to scrape the ice cream from the movable flat and arc-shaped walls as the ice cream is being dispelled from the dispenser.

Still a further object is to provide means of adjustment, whereby the sizes of the sector-shaped piece of ice cream may be varied, as for instanc, when it is desirable to have it fit a fifth of a pie or a sixth of a pie, the device in its largest limit of adjustment, preferably being made to serve a piece of ice cream to fit a fourth of a pie.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a perspective view of my device.

Fig. 2 is an enlarged sectional view on the line 2—2 of Fig. 1, illustrating the sector-shaped casing filled with ice cream and showing in dotted lines, the position of the ice cream relative to the casing when it is discharged.

Fig. 3 is an enlarged detail sectional view on the line 3—3 of Fig. 2.

Fig. 4 is an enlarged detail sectional view on the line 4—4 of Fig. 2; and

Fig. 5 is an inverted perspective view of a portion of a modified form in which the bottom cover plate has been cut away and the walls connected to the bottom cover plate shown in section.

On the accompanying drawings, I have used the reference character A to indicate generally, a casing. The casing A may be made in two halves having flanges 10 and 12 all around their edges extending toward and abutting against each other. The two halves of the casing A may be held in assembled position by rivets 14.

The casing A, when assembled, comprises a handle portion 16 and a sector-shaped casing 18. The sector-shaped casing 18 consists of a top and bottom flat wall and an arc-shaped wall 20 and a straight wall 20ª, and one open side. A pivot pin 22 extends through the apex of the sector-shaped casing 18 and the arc-shaped wall 20 is formed on a radius from the pin 22.

A movable dispeller blade 24 is provided at one end with a curved portion 26 extending around the pivot pin 22, whereby the blade 24 is pivotally mounted with respect to the casing A. Flanges 28 extend from the dispeller blade 24 for the purpose of reinforcement, due to the resulting channel construction of the blade.

A second pivot pin 29 extends through the casing A and an operating lever B is pivoted on the pin 29. The lever B comprises a portion 30 adapted to be engaged by the fingers of the operator and a portion 32 formed slightly at an angle to the portion 30. A link 34 has one end pivotally connected to a pin 36 extending through the flanges 28 of the blade 24 and has its other end pivotally connected by a pin 38 to the arm 32 of the lever B. A plurality of openings 40 are provided through the upper and lower walls of the casing A and a stop pin 42 is adapted to be inserted selectively in either of the openings 40. The lower end of the pin 42 may be enlarged and split, as indicated in Fig. 3, so that when inserted through a pair of the openings 40 it will not accidentally slip out, but the enlarged end will expand to prevent such displacement.

For holding the lever B against the stop pin 42, I provide a spring 44 having one end connected to the casing A and its other end connected to the lever B. The spring 44 is wound around the pivot pin 29, as clearly illustrated in Fig. 3 of the drawings.

From the foregoing description, it will be obvious that the spring 44 serves to hold the lever B against the stop pin 42, whereby the dispeller blade 24 normally assumes the full line position illustrated in Fig. 2.

In this position, the open end of the casing A is inserted into a can of ice cream for filling the sector-shaped casing with ice cream 46, as shown in section in Fig. 2. The dispenser may then be held in proper position relative to a piece of pie, whereupon the portion 30 of the lever B may be engaged by the finger or thumb of the operator and moved in the direction of the arrow 48. Such movement causes the link 44 to move the dispeller blade 24 to the dotted line position, whereby the sector-shaped piece of ice cream assumes a position outside of the casing and may be placed on the piece of pie.

In the modified form of my device as illustrated in Fig. 5, I have shown the dispeller blade 24 as having a flat wall 48 connected to it. The flat wall 48 is pivoted on the pin 22 and may be secured to the dispeller blade 24 by means of a screw 50, which may be selectively positioned in screw-threaded openings 52 in the wall 48. If desired, a slot connection may be provided instead of the series of openings 52.

The flat wall 48 terminates in an arc-shaped wall 54 and both the wall 48 and the wall 54 fit snugly against one of the flat walls of the sector-shaped casing 18 and the arc-shaped wall 20 thereof. A stripper blade 56 is provided which may also have one end mounted on the pivot pin 22 and its other end may extend upwardly, as indicated at 58 and be secured to the upper flat wall of the casing A.

Remembering that the device shown in Fig. 5 is in inverted position, it will be seen that when this form of construction is used, the casing may be filled with ice cream and upon dispelling the ice cream, the flat wall 48 and the arc-shaped wall 54 will travel with the ice cream and the flat wall will be positioned above it. As the blade 24 is moved, the ice cream will be scraped from the flat wall 58 and the curved wall 54 so that when in its outwardly extended position, it will drop from these walls and onto the piece of pie. The adjustment consisting of the screw 50 and the screw-threaded openings 52 provides for the dispelling of different sized pieces of ice cream.

From the description of my invention, it will be obvious that I have provided an efficient dispenser for the purpose of dispensing sector-shaped pieces of ice cream onto pieces of pie, whereby the ice cream fits the pie and lies flat thereon. I have heretofore experienced great difficulties in making a practical device for serving ice cream in the substantially triangular shape for fitting the top of a piece of pie. Such a device in order to be practical must be easy to operate, simple and economical to make and must easily cut out the slab of ice cream in the proper shape, and discharge it upon the pie. In restaurants and cafés ice cream is usually kept in bulk in packers. It is very difficult to take a flat triangular piece from a packer of cream. The cream is sometimes hard and sometimes soft. A piece of ice cream sliced off may fall to pieces. With my device, however, a properly shaped piece can be conveniently taken out and dispensed. When the device is forced into the body of the ice cream, the piece cut out is compressed so that it will hold its shape when ejected upon the pie. All the other desirable features mentioned are found in dispenser, as I have determined by actual use of it in my business.

Various changes which have different methods of moving the dispeller blade 24 may be made without departing from the real spirit and purpose of my invention, and it is my intention to cover by my claims, any modified forms of structure or use of mechanical equivalents, which may be reasonably included within their scope.

I claim as my invention:

1. An ice cream dispenser comprising a sector-shaped casing including an open end and a curved closed end, a handle for the casing, a dispeller blade adapted to normally form a closure member and to operate in conjunction with said curved closed wall to form a receptacle, said blade having one end pivoted to the apex of said casing and means for swinging said blade about its pivotal axis to a position substantially coinciding with said open end of said casing.

2. In a dispenser of the character disclosed, a casing comprising a pair of flat walls, a handle for the casing, a pivot pin supported by said walls, an arc-shaped wall formed on a radius from said pin, a dispeller blade pivotally supported on said pin and having its free end terminating adjacent said arc-shaped wall, means for actuating said dispeller blade, and a flat movable wall secured to said dispeller blade and lying adjacent one of the flat walls of said casing.

3. In a dispenser of the character disclosed, a casing comprising a pair of flat walls, a handle for the casing, a pivot pin supported by said walls, an arc-shaped wall formed on a radius from said pin, a dispeller blade pivotally supported on said pin and having its free end terminating adjacent said arc-shaped wall, means for actuating said dispeller blade, a flat movable wall secured to said dispeller blade and lying adjacent one of the flat walls of said casing, and a stripper device adapted to scrape said movable wall as it is moved from one position to another.

4. In a dispenser of the character disclosed, a casing comprising a pair of flat walls, a handle for the casing, a pivot pin supported by said walls, an arc-shaped wall formed on a radius from said pin, a dispeller blade pivotally supported on said pin and having its free end terminating adjacent said arc-shaped wall, a lever for causing pivotal movement of said dispeller blade, and a flat movable wall secured to said dispeller blade and lying adjacent one of the flat walls of said casing, said movable wall terminating in an arc-shaped wall adapted to lie adjacent the arc-shaped wall of said casing.

5. In a dispenser of the character disclosed, a casing comprising a pair of flat walls, a handle for the casing, a pivot pin supported by said walls, an arc-shaped wall formed on a radius from said pin, a dispeller blade pivotally supported on said pin and having its free end terminating adjacent said arc-shaped wall, means for swinging said dispeller blade on said pin, and a flat movable wall secured to said dispeller blade and lying adjacent one of the flat walls of said casing, said movable wall terminating in an arc-shaped wall adapted to lie adjacent the arc-shaped wall of said casing, and a stripper blade adapted to scrape said movable flat and arc-shaped walls as they are moved with the dispeller blade.

6. In a dispenser of the character disclosed, a casing comprising a pair of flat walls, a handle for the casing, a pivot pin supported by said walls, an arc-shaped wall formed on a radius from said pin, a dispeller blade pivotally supported on said pin and having its free end terminating adjacent said arc-shaped wall, means for imparting pivotal movement to said dispeller blade, and a flat movable wall secured to said dispeller blade and lying adjacent one of the flat walls of said casing, said movable wall terminating in an arc-shaped wall adapted to lie adjacent the arc-shaped wall of said casing, and a stripper blade adapted to scrape said movable flat and arc-shaped walls as they are moved with the dispeller blade, said dispeller blade being adjustable to assume different positions when moved to its inner limit of movement whereby to vary the size of the sector-shaped piece of plastic material discharged from the dispenser.

7. In an ice cream dipper of the class described, a substantially triangular shaped receptacle open at one side, a handle extending laterally from the rear wall of the receptacle adjacent the closed side thereof, a blade pivoted at one end to the apex portion of the triangular shaped receptacle and arranged for swinging movement between the top and bottom walls thereof, said blade moving inwardly toward the closed side of the receptacle during the filling of the dipper with ice cream, and means for engagement with the blade to move the same toward the open side of the receptacle to discharge the contents therefrom.

Des Moines, Iowa, May 14, 1928.

GUS G. GARVIS.